June 9, 1959 — J. LOECY, JR — 2,889,816
HYDRAULIC ROTARY ACTUATOR
Filed Feb. 8, 1954
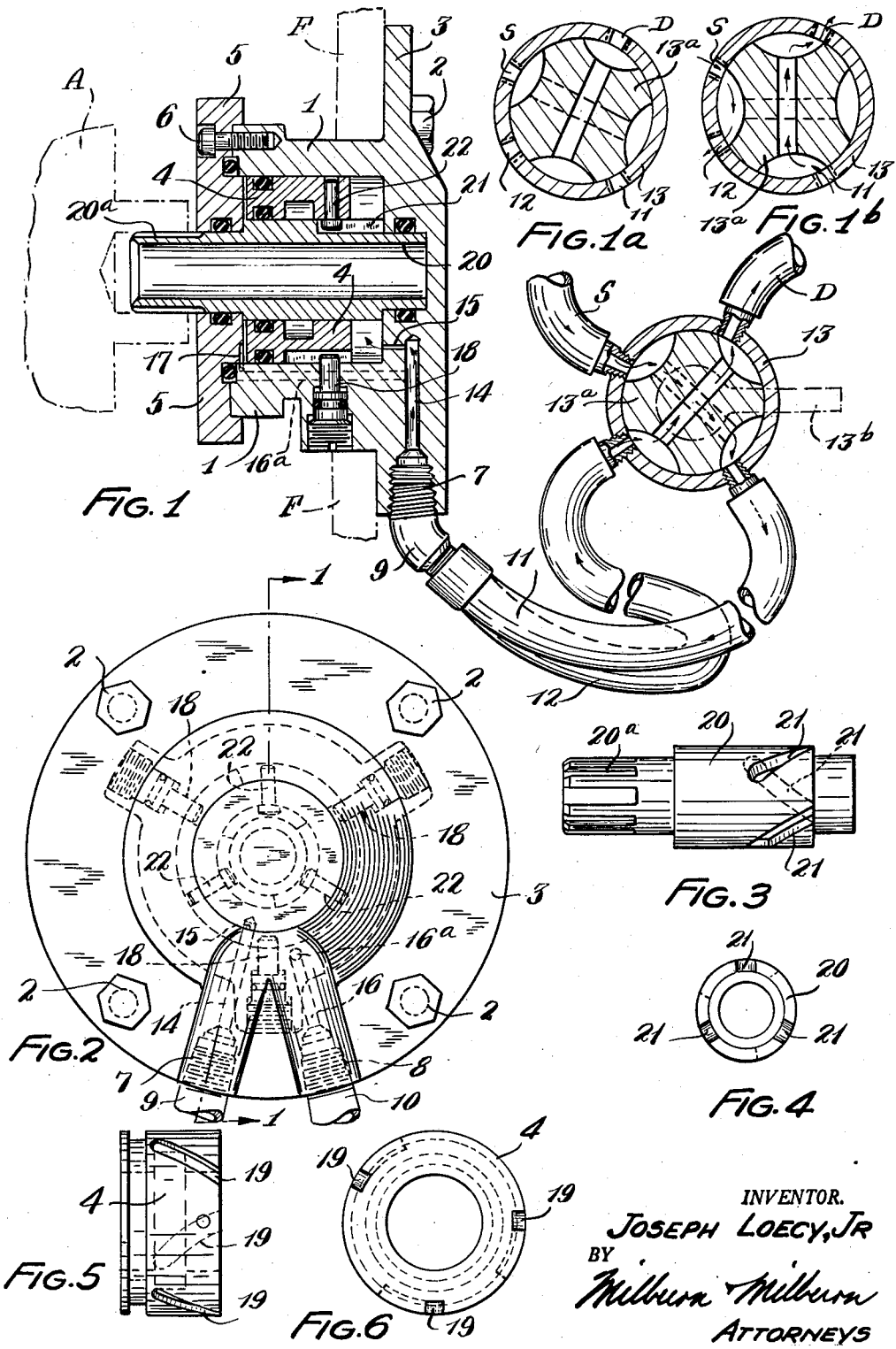
INVENTOR.
JOSEPH LOECY, JR
BY
ATTORNEYS

2,889,816
HYDRAULIC ROTARY ACTUATOR

Joseph Loecy, Jr., Euclid, Ohio

Application February 8, 1954, Serial No. 408,730

2 Claims. (Cl. 121—38)

This invention is for an improved hydraulic rotary actuator that is adapted for use in various aircraft and industrial applications.

The object of my present invention is to devise an actuator by which there may be effected rotary adjustment and in which such adjustment may be limited to any desired extent so as to thereby maintain accuracy in the control thereof.

A further object is to devise such an actuator with hydraulic means for manipulation thereof and with means for effecting rotary adjustment to any desired extent.

A further object is to devise such an actuator with means for applying hydraulic pressure to both ends of a piston and for varying the ratio of such end pressures so as to effect in an accurate manner any desired degree of adjustment, which is made possible by the resultant movement of the piston.

Another object is to devise a unitary form of actuator that is readily adaptable to various organizations of the general character above briefly referred to.

Other objects will appear from the following description and claims when considered together with the accompanying drawings.

Fig. 1 illustrates the general assembly in which my present improved actuator is shown in section, this view corresponding to line 1—1 of Fig. 2 and representing the valve in position for effecting movement of the piston in one direction;

Fig. 1a illustrates the neutral position of the valve for holding the piston in any desired position to which it may be moved, this view being shown diagrammatically;

Fig. 1b illustrates the position of the valve for effecting movement of the piston in the opposite direction from that corresponding to Fig. 1, this view also being diagrammatic;

Fig. 2 is an end elevation of my present improved unitary device;

Fig. 3 is a view of the actuatable member which forms part of my present unitary device and to which the part, to be adjusted, may be attached;

Fig. 4 is an end elevation thereof;

Fig. 5 is a view of the piston; and

Fig. 6 is an end view thereof.

The present invention is to be recognized as a unitary form of device that may be installed in various organizations in which it may be desired to produce a rotary adjustment in a convenient and accurate manner.

In the present illustration, the casing 1 may be secured to a frame or support F by means of the bolts 2 through the annular portion 3 at the one end of the casing. The body of the casing 1 is formed with a cylindrical interior within which the piston 4 is adapted for reciprocating adjustment therealong. The other end of the casing 1, that is opposite the annular part 3, is closed by the plate 5 which is bolted thereto, as indicated by reference numeral 6. Hermetic sealing rings are provided between the piston and its cylinder wall and also between the plate 5 and the end of the casing 1, as well as elsewhere, as indicated in the present drawing.

The end of the casing 1 has radially disposed screw-threaded openings 7 and 8 that are adapted to receive the threaded connections 9 and 10 for the tubes 11 and 12, respectively, from a suitable source of hydraulic pressure through the supply means of connection S and the intermediate control valve 13. While this valve means 13 is here illustrated as a single rotary valve, it is to be understood that there may be employed for this purpose either a single or multiple valve arrangement of different types and in different combinations. The opening 7 is connected with the ducts 14 and 15 which have communication with one end of the cylinder at the one end of the piston 4; while the opening 8 has communication through the ducts 16, 16a and 17 with the other end of the cylinder at the opposite end of the piston 4.

With the valve 13 in the position indicated in Fig. 1 of the present drawing, there will be communication of the hydraulic pressure through the supply means of connection S, thence through a transverse passage in the core of the valve (as indicated by arrows) and to one end of the piston, while at the same time pressure may be relieved from the other end of the piston through another transverse passage at another point of the valve core and to the drain connection D (as indicated by arrows). When there has been obtained the desired position of the piston by means of the relative pressures upon the two ends of the same, the valve core may be rotated counter-clockwise, as viewed in the present drawing, to the position indicated in Fig. 1a hereof so as to bring one end of each of the transverse passages to a full or closed portion of the valve casing and thereby prevent any further supply or discharge of pressure through the valve. In this way the desired pressures which have been established upon the two ends of the piston may be maintained and the piston may thus be held in the desired position. Then, when it might be desired to move the piston in the opposite direction, this may be accomplished by turning the valve core further in the counter-clockwise direction, as viewed in the present drawing, to the position indicated in Fig. 1b hereof so as to permit communication of the hydraulic pressure through its means of communication S, thence through the valve (as indicated by arrows) and to the other end of the piston and at the same time permit relief of pressure from the first end of the piston through the valve (as indicated by arrows) to the drain. Likewise, here again, turning of the valve to the proper point will serve to discontinue such flow and to hold the piston under pressure at both ends thereof and hence in the position to which it has thus been moved. Thus the piston 4 may be moved in either direction to any desired extent and may be stopped and held at any desired position by mere manipulation of the valve means 13. That is to say, there may be hydraulic pressure upon both ends of the piston 4 at all times, which may therefore be referred to in the present form of disclosure as a floating piston; and the position of the piston 4 will depend upon the ratio of the pressures upon the two ends thereof at any given time. Valve core 13a is rotatable by handle 13b.

Positioned in the wall of the casing 1 so as to extend radially inwardly thereof are the pins 18 which project into the inclined grooves 19 in the outer surface of the piston 4. In this way the piston 4, as it is moved longitudinally of the cylinder in either forward or reverse direction, is simultaneously given also a rotary movement in one direction or the other.

Within the piston 4 there is a concentrically arranged cylindrical rotatable member 20 that has its outer surface provided with a plurality of inclined grooves 21 to receive the inner ends of the radially and inwardly disposed pins 22 that are mounted upon the piston 4; the direction of the inclination of the grooves 21 being the opposite of that of the grooves 19 so as to amplify the turning movement of the inner member 20. There may be any desired number of grooves and pins in each instance and the angularity of the grooves may be of any desired degree.

As may be observed from the accompanying drawing, the member 20 has an annular shoulder in engagement at its one end with the casing 1 and has an annular shoulder near its other end in engagement with the plate 5 so as to thereby be held in assembly for operation in the manner herein set forth. Suitable sealing means is provided here also, as indicated in the present drawing. The one end of the member 20 may be provided with a suitable form of connecting means 20a, as for instance a spline or gear, for attachment of a part A that is to be adjusted thereby in any given aircraft or industrial assembly.

Thus, by application of hydraulic pressure to the piston 4, it may be given simultaneously a turning movement and a longitudinal movement; and the extent of such combined movement in either direction may be determined by the ratio of the pressures upon the two ends of the piston 4 at any given time. That is, by proper manipulation of the valve 13, there may be pressure upon the one end of the piston so as to cause it to move in the one direction; and, upon manipulation of the valve means 13 to another position as herein illustrated, there may be pressure upon the other end of the piston 4 so as to cause a reverse movement of the piston. At the same time the adjustable part A that is connected to the actuatable means 20 may be given a corresponding degree of rotatable movement in either direction and may be positively held in such adjusted position by virtue of the fluid pressures simultaneously upon both ends of the piston 4.

It is to be understood that the present form of disclosure is merely for the sake of illustration and that there might be devised various modifications thereof without departing from the spirit of my invention as herein set forth and claimed. For instance the design of my present device may be varied so as to be able to produce any desired resultant angular adjustment by means of a certain length of stroke. Also, instead of the interengaging pins and grooves, there may be employed spiral spline means of inter-connection for the same purpose. And also, as above noted, my present device is not limited to the use of any one particular form of valve or valves but this control means for the hydraulic flow may be of different forms with either single or multiple valves and suitable connections therefor.

As above stated, the present device is well adapted for use in various aircraft and industrial applications and it makes possible accurate and dependable adjustment about an axis; and also there may be obtained a desired degree of rotary adjustment by means of a comparatively slight axial movement of the piston. The unitary form of this device constitutes another advantage from the standpoints of handling and assemblying.

In addition to the several practical advantages above briefly referred to, flowing from my present invention, still further advantages may suggest themselves to those who are familiar with the art to which this invention relates.

What I claim is:

1. In a device of the class described, the combination of a body having a cylinder, actuatable means adapted for rotary movement in opposite directions, means for effecting rotary movement of said actuatable means including a piston having operative connection with said actuatable means and reciprocatable back and forth within said cylinder, tubular means outside of said body for supplying fluid pressure to the opposite sides of said piston, and rotary valve means separate from said actuatable means and located in said tubular means outside of said body for varying the fluid pressure upon the opposite sides of said piston so as to thereby permit the desired rotary adjustment of said rotatable actuatable means, said valve means having a neutral position for maintaining the fluid pressure thus established upon the opposite sides of said piston so as to hold said actuatable means in any desired position.

2. The same structure as recited in claim 1 hereof and in which said means for effecting said rotary movement of said actuatable means includes pin and inclined groove means of operative connection between said piston and the wall of said cylinder.

References Cited in the file of this patent

UNITED STATES PATENTS

| 448,263 | Rymer | Mar. 17, 1891 |
|---|---|---|
| 1,208,115 | Eynon | Dec. 12, 1916 |
| 1,700,468 | Clutter | Jan. 29, 1929 |
| 1,776,228 | Coffman | Sept. 16, 1930 |
| 1,806,083 | Roberts | May 19, 1931 |
| 1,989,387 | Vickers | Jan. 29, 1935 |
| 2,050,421 | Charles | Aug. 11, 1936 |
| 2,370,137 | Biggert | Feb. 27, 1945 |
| 2,456,361 | Attleslander | Dec. 14, 1948 |
| 2,742,021 | Geyer | Apr. 17, 1956 |
| 2,774,337 | Geyer | Dec. 18, 1956 |

FOREIGN PATENTS

| 449,808 | Great Britain | July 6, 1936 |